(12) United States Patent
Manabe

(10) Patent No.: US 7,274,120 B2
(45) Date of Patent: Sep. 25, 2007

(54) DRIVE UNIT AND IMAGE PICKUP UNIT EQUIPPED WITH THE DRIVE UNIT

(75) Inventor: Mitsuo Manabe, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/230,739

(22) Filed: Sep. 21, 2005

(65) Prior Publication Data

US 2006/0061223 A1    Mar. 23, 2006

(30) Foreign Application Priority Data

Sep. 21, 2004   (JP) ............................. 2004-273475

(51) Int. Cl.
*H20K 41/00* (2006.01)
*G02B 7/02* (2006.01)

(52) U.S. Cl. ............................. 310/12; 310/13; 310/15; 310/80; 310/14; 310/27; 359/811; 359/820

(58) Field of Classification Search ................. 310/12, 310/13, 15, 80, 14, 27; 359/811–830, 694, 359/696

See application file for complete search history.

(56) References Cited

U.S. PATENT DOCUMENTS

| 3,824,420 | A | * | 7/1974 | Stegeman et al. ............ 310/80 |
| 4,145,625 | A | * | 3/1979 | Seilly ........................... 310/27 |
| 4,596,449 | A | | 6/1986 | Iwata et al. |
| 4,605,286 | A | | 8/1986 | Sumi |
| 4,633,357 | A | * | 12/1986 | Kinjo ........................... 360/136 |
| 4,712,027 | A | * | 12/1987 | Karidis ......................... 310/12 |
| 4,767,958 | A | * | 8/1988 | Sasaki ......................... 310/257 |
| 5,099,161 | A | * | 3/1992 | Wolfbauer, III .............. 310/80 |
| 5,990,587 | A | * | 11/1999 | Shimanovich et al. ........ 310/80 |
| 6,800,970 | B2 | | 10/2004 | Aoshima |

FOREIGN PATENT DOCUMENTS

| JP | 56-147132 | 11/1981 |
| JP | 62-195615 | 8/1987 |

* cited by examiner

*Primary Examiner*—Darren Schuberg
*Assistant Examiner*—Iraj Mohandesi
(74) *Attorney, Agent, or Firm*—Young & Thompson

(57) ABSTRACT

A drive unit for performing precise linear movement of a driven object comprises a motor having a cylindrical stator and a cylindrical rotor that is coaxially put in the cylindrical stator and capable of rotating relatively to the cylindrical stator, a movable barrel for holding a driven object mounted for rotation in the cylindrical rotor, a motion transformation mechanism comprising an internal helical groove formed in the cylindrical rotor and an external helical thread formed on the movable barrel which engage with each other so as to cause relative rotation between the cylindrical rotor and the movable barrel when the cylindrical rotor rotates, thereby transforming rotational movement of the rotor into a linear movement of the movable barrel, and a head-on striking structure provided between the helical groove and the helical thread to restrict the relative rotation at an intended extreme end of an axial path of the movable barrel.

5 Claims, 5 Drawing Sheets

DRIVE UNIT AND IMAGE PICKUP UNIT EQUIPPED WITH THE DRIVE UNIT

BACKGROUND OF THE INVENTION

1. Field of the Invention

The present invention relates to a drive unit for driving a movable element and an image data pickup device equipped with the drive unit 2. Description of Related Art An image pickup device for taking a picture and acquiring a digital image of the picture is incorporated in a wide range of small instruments such as mobile phones and personal digital assistance (PDA) devices. Through the instrumentality of equipping such a small insent always going with the possessor with an image pickup unit the possessor is allowed to take pictures readily without taking pains to carry on a digital camera or a video camera. The small instrument is equipped with a radio or infrared data communication function in general way and capable of being and is in an advantageous position for transmitting a picture image to other mobile phones or personal computers immediately on the scene, in consequence.

The image pickup device installed in such a small instrument like a mobile phone is considerably small in size as compared with ordinary digital cameras and is greatly bounded by size of constituent elements such s lenses and a charge coupled device (CCD) and a space for the constituent elements. Therefore, the small instrument is too inadequate in light of photographic capability and image quality to help substitute for a digital camera and is restricted to a case where image quality is not essential such as a case where an image is used in substitution for a memorandum or a case where an image is used as a stand-by image of a mobile phone.

Recent development of high density micro CCD chips and high contrast micro lenses have enabled rapid improvement on quality of images that small instruments such as mobile phones and PDA devices provide. In order to enhance the photographic capability that is left as a problem to be solved, it is desired that the small instruments have an automatic focusing function and/or a zooming function which ordinary digital cameras are equipped with standard features.

In respect of digital cameras or video cameras, both automatic focusing and zooming are performed by moving a lens or lenses along an optical axis of the lens system by a DC motor or a stepping motor, or otherwise by means of compression-extension of a piezoelectric element. In cases where these motors are incorporated in the small instruments such as mobile phones, in terms of downsizing the instruments and control accuracy of lens movement it is believed that it is preferred to employ a hollow stepping motor comprising a hollow cylindrical rotor mounted on a lens holding barrel and a stator that surrounds the rotor so as to rotate the rotor with a drive pulse of electric current. The stepping motor, known as a pulse motor, is precisely controlled in rotation by controlling drive pulses of electric current applied to the stator. Therefore, the lenses can be moved to a desired position with high accuracy by the stepping motor mounting the lenses in the hollow cylindrical rotor, so as thereby to perform automatic focusing and zooming precisely. Lens drive mechanisms including a hollow stepping motor known from, for example, Published Japanese Patent Application Nos.56-147132, 59-109007 are such that the stepping motor moves a lens barrel along an optical axis through a cam mechanism disposed between the lens barrel and the hollow rotor. An alternate lens drive mechanisms such as known from, for example, Unexamined Japanese Patent Publication Nos. 60-415, 60-416 and 60-417 include a stepping motor that rotation of the hollow rotor itself moves a lens barrel along an optical axis. There has further been proposed in, for example, Unexamined Japanese Patent Publication No. 62-195615 a lens drive mechanism including a stepping motor that has hollow rotor equipped with a lens barrel formed as an integral part thereof.

The stepping motor possibly encounters such a step-out that the stepping motor can not comply with a demand for an unreasonable raise in rotational speed resulting from a drop in ambient air temperature in which a digital camera or a video camera is put to use and things like that, and comes to a halt consequentially. Upon an occurrence of a step-out of the stepping motor, it may fail to put the lens in a best focus position due to a failure in detecting a position of the lens on a lens path, with the consequence that the lens may fail to perform focusing and/or zooming operation.

SUMMARY OF THE INVENTION

It is therefore an object of the present invention to provide a compact drive unit for precisely driving an object such as an optical lens element or an optical lens system and an image pickup unit having the drive unit The foregoing object is accomplished by a drive unit for performing linear movement of a driven object such as an optical lens element or an optical lens system that comprises an electric motor such as a stepping motor having a cylindrical stator for generating a magnetic field in a cylindrical space and a cylindrical rotor coaxially put in the cylindrical stator and capable of rotating relatively to the cylindrical stator with the magnetic field, a movable cylindrical member for holding the driven object mounted for rotation in the cylindrical rotor, a motion transformation mechanism comprising a helical groove formed on an inner wall surface of the cylindrical rotor and a helical thread formed on an outer surface of the movable cylindrical member which engage with each other so as to cause relative rotation between the cylindrical rotor and the movable cylindrical member when the cylindrical rotor rotates, thereby transforming rotational movement of the rotor into a linear movement of the movable cylindrical member, and a head-on striking structure provided between one extreme ends of the helical groove and the helical thread for allowing an extreme end of the thread to strike head-on so as thereby to restrict the relative rotation between the cylindrical rotor and the movable cylindrical member.

According to the drive unit of the present invention, the movable cylindrical member is prevented from causing further axial movement by the head-on striking structure when reaching an intended extreme end of an axial path length while the rotor rotates continuously. The head-on striking structure prevents the helical groove and the helical thread from entering tight engagement even when the stepping motor is brought into a step-out state. Therefore, the stepping motor is unthreaded from the stepout state by reversing the rotor, so as to proceed with drive control of the movable cylindrical member immediately after getting trapped into step-out.

The utilization of this advantageous feature of the drive unit eliminates the necessity for a position sensor for detecting a moved position of the movable cylindrical member. For example, the movable cylindrical member is precisely controlled in position by controlling the stepping motor in such a way as to rotate the rotor in one direction intentionally until the stepping motor comes into a step-out state, and then reversing the rotor through a rotational angle corresponding to a desired distance from the step-out position as a reference position.

The drive unit having such a simple head-on striking structure is especially suitable for portable information equipments equipped with an image pickup feature such as a cell phone. In such a portable information equipment, the movable cylindrical member comprises a lens holder barrel for holding optical lens elements or an optical lens system with an optical axis aligned with a rotational axis of the rotor. The drive unit can move the optical lens system for focusing and/or zoning precisely and smoothly.

BRIEF DESCRIPTION OF THE DRAWINGS

The foregoing and other objects and features of the present invention will be clearly understood from the following detailed description when reading with reference to the accompanying drawings, wherein the same reference signs have been used to denote same or similar parts throughout the drawings, and in which.

DETAILED DESCRIPTION OF THE PREFERRED EMBODIMENTS

Figure 1:
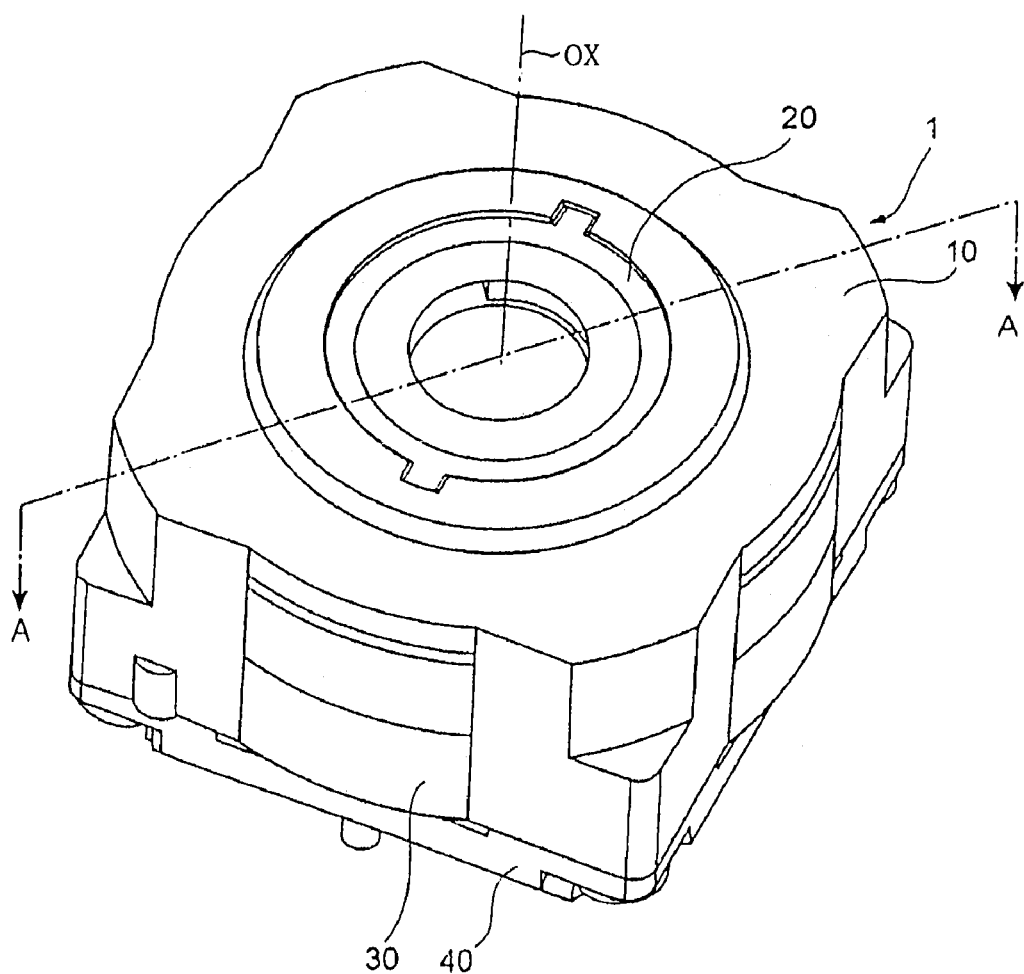
FIG. 1 is a perspective view of an image pickup device according to an embodiment of the present invention.
Figure 2:
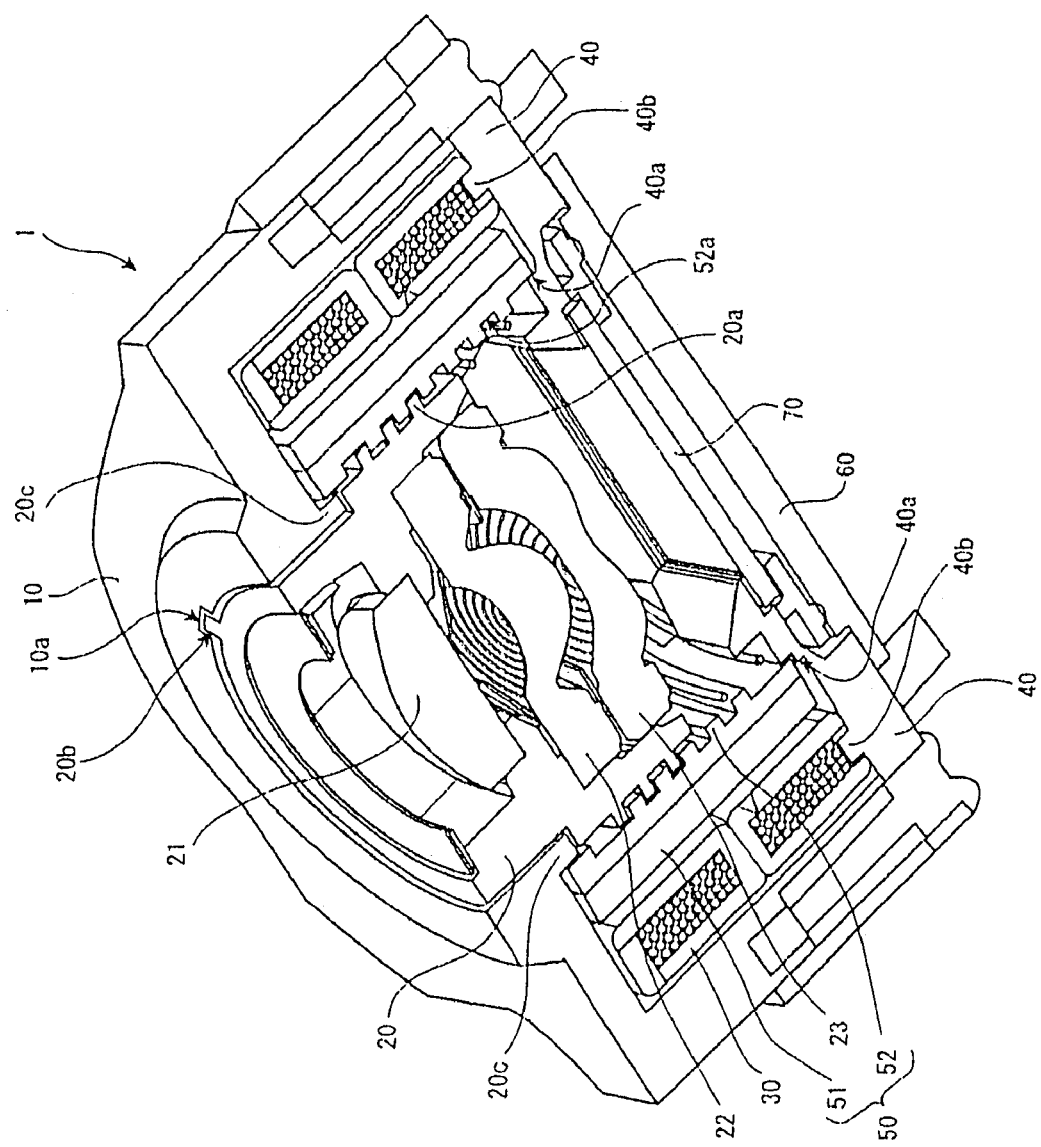
FIG. 2 is a cross-sectional view of the image pickup device taken along a line II-II of FIG. 1.

Referring to the accompanying drawings in detail, and in particular, to FIGS. 1 and 2 showing an image pickup device 1 that is installed in, for example, a mobile phone, the image pickup device 1 has an automatic focusing feature. Automatic focusing is performed by moving one or more lenses in a direction along an optical axis (which is hereafter referred to as an axial direction) OX. The image pickup unit 1 includes a stepping motor and an optical lens system both of which are disposed within a unit casing comprising a housing shell made up of two mating shell halves, namely a front housing shell 10 having a top flange and a rear housing shell 40 having a bottom flange coupled with each other with set screws (not shown). The stepping motor comprises a cylindrical stator 30 and a cylindrical rotor 50. The optical lens system, which may be of a single component type or a multiple component type, comprises, for example in this example, three lens elements, namely first, second and third lens elements 21, 22 and 23 mounted within a cylindrical lens holder 20. The image pickup device 1 is equipped with an image sensor such as a charge coupled device (CCD) image sensor 60 in alignment with the optical lens.

The CCD image sensor 60 is attached to the rear cover 40. The lens holder 20 and the rotor 50 are coaxially arranged in order from the optical axis OX within the stator 30. When receiving drive pulses of electric current, the stator 30 causes rotational movement of the rotor 50 in steps at a rate proportional to the number of drive pulses of electric current.

Figure 3:
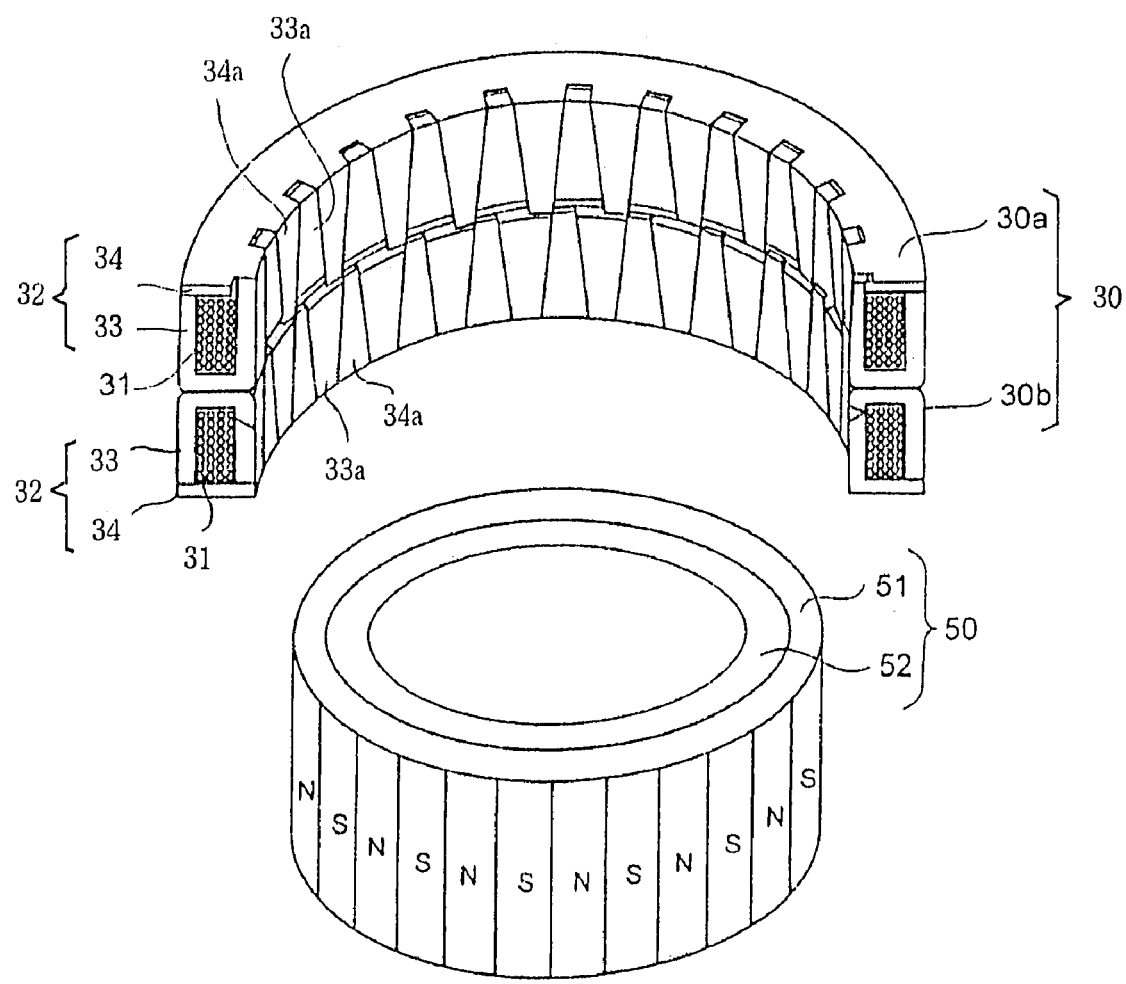
FIG. 3 is a view of a stator and a magnet.

As shown in detail in FIG. 3, the stator 30 comprises two cylindrical coil assemblies, namely a front coil assembly 30a and a rear coil assembly 30b. These coil assemblies 30a and 30b are identical in structure with each other and, accordingly, the following description is directed to the front coil assembly 30a only by way of example. The front coil assembly 30a comprises a stator coil 31 having a great number of wire convolutions and a cylindrical hollow coil case 32 made up of a case shell 33 for receiving the stator coil 31 therein and a case cover 34. The cylindrical hollow coil case 32 has an inner wall made up of two wall halves which are complementary to each other. Specifically, the case shell 33 has a saw-tooth wall consisting of a number of, for example 48, upward saw-teeth 33a arranged at regular intervals which form one of the mating wall halves. Similarly, the case cover 34 has a saw-tooth wall consisting of a number of, for example 48, downward saw-teeth 34a at regular intervals which form the other of the mating wall halves. These saw-tooth wall halves are interlaced so that the saw-teeth 33a and 34a bridge interspaces between the respective adjacent saw-teeth of the counter saw-tooth wall, thereby forming an entire inner wall. The saw-tooth wall halves are designed so that a specified circumferential gap is left between each adjacent saw-teeth 33a and 34a, when they are interlaced. As apparent, a center line distance between the saw-teeth 33a and 34a of the respective case shell 33 and the case cover 34 is half a pitch of the saw-tooth.

Drive pulses of electric current are applied alternately to the stator coils 31 of the coil assemblies 30a and 30b. Each of the stator coils 31 causes a magnetic flux extending within a space of the stator 30 beyond circumferential gaps between the respective adjacent saw-teeth 33a and 34a. In consequence, a magnetic field is formed between each adjacent saw-teeth 33a and 34a one of which is polarized as N and the other as S.

The rotor 50 comprises a cylindrical outer shell 51 and a cylindrical inner shell 52 fixedly mounted in the cylindrical outer shell 51 as one unit. The cylindrical outer shell 51 is a permanent magnet having an alternate N and S polarities circular row and is made by magnetizing a plastic cylindrical ring containing a magnetic material such as neodymium by passing it through a cylindrical magnetic head having a 48 alternate N and S polarities circular row. The cylindrical inner shell 52 is a plastic cylindrical ring having an internal helical groove 52a for slide engagement with an external helical thread 20a of the cylindrical lens holder 20 (see FIG. 2).

The rotor 50 causes relative rotation with respect to the stator 30 with alternative magnetic repulsive and attractive forces of magnetic fields generated by the stator 30. One revolution of the rotor 50 is split into 48 angular rotations. In other words, the rotor 50 performs 48 steps, namely the number of magnetic poles, of rotational movement to complete one revolution. The rotor 50 is forced to perform forward rotational movement by repeatedly exciting the stator coils 31 of the front and rear coil assemblies 30a and 30b forward in order and then backward in order. On the other hand, the rotor 50 is forced to perform backward rotational movement by repeatedly exciting the stator coils 31 of the front and rear coil assemblies 30a and 30b forward and backward, respectively, in order and then backward and forward, respectively, in order. Referring back to FIG. 2, the lens holder 20, that is fixedly mounted as a driven object in the rotor 50, holds an optical lens system including, for example, first, second and third lens elements 21, 22, and 23 arranged in order from the front housing shell 10 to the rear housing shell 40. Citing an example of the lens elements, the first lens component 21 comprises a positive power meniscus lens, preferably a glass lens, having a concave front surface (a surface on the side of the front housing shell 10); the second lens element 22 comprises a negative power meniscus lens, preferably a plastic lens, having an aspheric front surface and a rear concave surface (a surface on the side of the rear housing shell 40); and a third lens element 23 comprises a negative power lens, preferably a plastic lens, having an aspheric front surface and an aspheric-concave rear surface. The term "aspheric-concave surface" as used herein shall refer to a surface generally aspheric but concave at its center section.

The optical lens system embodying the present invention shall satisfying the following conditions:

$$0.6 < R1/f < 0.8 \quad (1)$$

$$-1.0 < f3/f < 0 \quad (2)$$

$$0.60 < \tan \theta < 0.70 \quad (3)$$

where f is the paraxial focal length of the overall optical lens system, f3 is the paraxial focal length of the third lens element, R1 is the curvature of the front convex surface of the first lens element, θ is the half angle of view for the maximum image height.

Satisfaction of these parameters set forth ensures a compact and high precision optical lens system comprising the lens elements 21, 22 and 23.

Figure 4A:
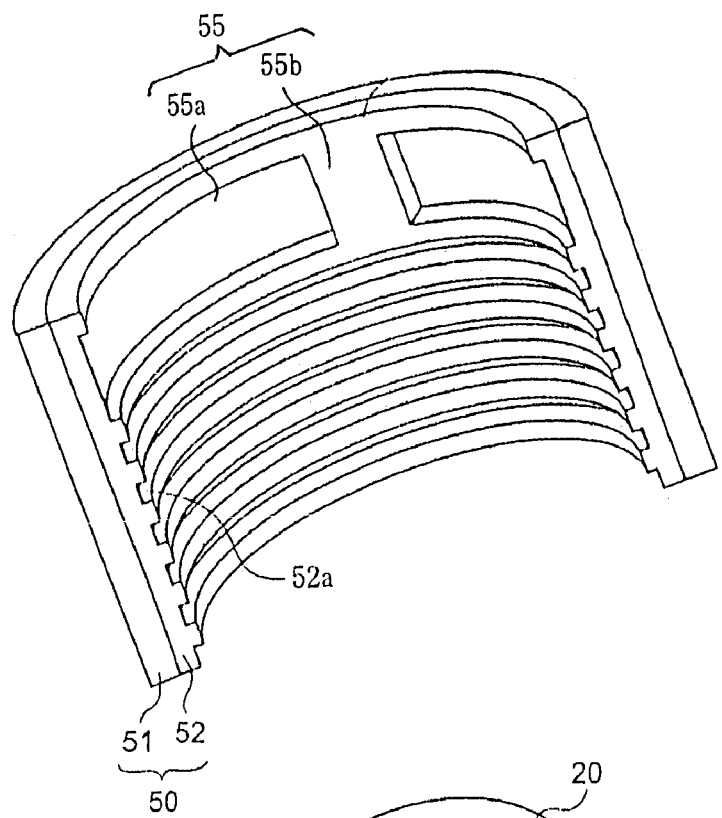
FIGS. 4A and 4B are perspective views of a lens holder and a rotor, respectively.
Figure 4B:
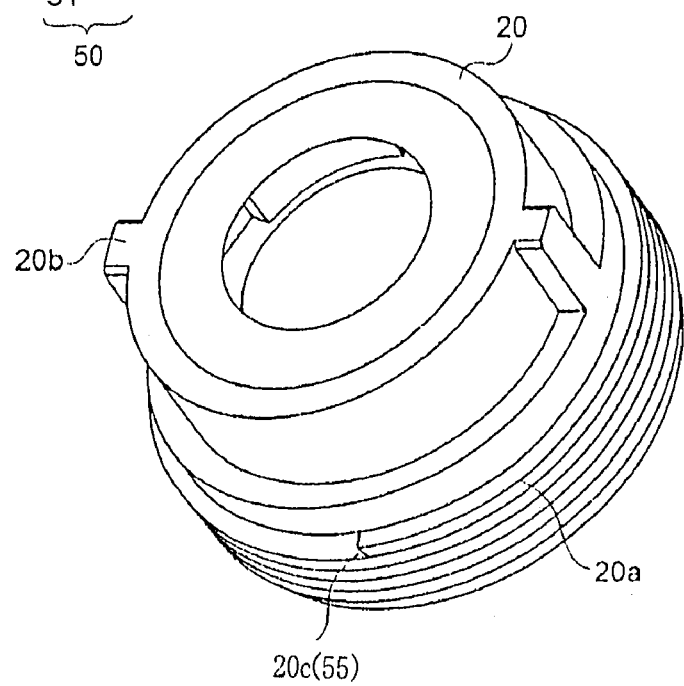

Referring to FIGS. 4A and 4B showing the rotor 50 and the lens holder 20, respectively, in detail, the cylindrical inner shell 52 is provided with an internal helical groove 52a formed in the internal wall surface thereof and an aperture 55a divide by a stopper pillar 55b in a forward section thereof. The forward end of the internal helical groove 52a leads into the aperture 55a and comes to a dead end at the stopper pillar 55b. The aperture 55a and stopper pillar 55b form a part of head-on striking structure 55 together with an extreme end 20c of the external helical thread 20a of the lens holder 20 for rotational restriction of the lens holder 20 which will be described later. The lens holder 20 is provided with a pair of axial guide rails 20b formed as an integral part in diametrically opposite positions and an external helical thread 20a as shown in FIG. 4B. The external helical thread 20a at an extreme end (front end) 20c is truncated so as to be able to striking against the stopper pillar 55a. In this instance, the helical groove 52a of the cylindrical inner shell 52 of the rotor 50 has convolutions or a groove length almost three times as long as the helical thread 20a of the lens holder 20. In other words, the lens holder 20 is allowed to cause axial movement equivalent to more than 96 steps of rotational movement of the rotor 50. The lens holder 20 is snugly fitted in the cylindrical inner shell 52 of the rotor 50 with the axial guide rails 20b received in a pair of axial guide grooves 10a, respectively, formed in the internal wall surface of the front housing shell 10 of the unit casing (see FIG. 2). By means of slide engagement between the helical groove 52a of the lens holder 20 and the helical thread 20a of the cylindrical inner shell 52 of the rotor 50 which form a rotational to linear transformation mechanism and slide engagement between the axial guide rails 20b of the lens holder 20 and the axial guide grooves 10a of the front housing shell 10 which form an anti-rotation structure, the lens holder 20 is axially moved back and forth. Further, the anti-rotation structure prevents the lens holder 20 from rotating relatively to stationary parts of the unit the image pickup 1 when the rotor 50 rotates, so that the optical lens system is ensured against shifts of an image due to a possible eccentricity of the lens elements when the lens holder 20 moves back and forth.

Linear axial movement of the lens holder 20 is controlled along the following lines. Every time receiving one drive pulse of electric current, the stator 30 causes one step of rotational movement of the rotor 50 forward or backward. This rotational movement of the rotor 50 is transformed to one step of forward linear axial movement of the lens holder 20 forward or backward through the rotational to linear transformation mechanism. The direction of rotational movement of the rotor 50 is reversed by applying a reversed drive pulse of electric current to the stator 20. In this instance, the lead of the thread 20a of the lens holder 20 is 13 µm per one step of rotational movement of the rotor 50, so that the lens holder 20 is allowed to perform linear axial movement approximately 1.25 mm during two complete revolutions (96 steps of rotational movements) of the rotor 50. Therefore, the image pickup unit 1 is capable of adjusting an axial position of the optical lens system in units of 13 µm.

If more than 96 drive pulses of electric current are sequentially applied to the stator 20, the rotor 50 is compelled to rotate more than two revolutions, so as thereby to cause the lens holder 20 to perform axial stepping movement beyond an allowed extreme end of movement. However, when the lens holder 20 approaches its extreme end of movement, the helical thread 20a strikes against the stopper pillar 55b at the extreme end 20c, so as thereby to restrict axial movement of the lens holder to the allowed extreme end of movement Such a step-out state is eliminated by applying reversed drive pulse of electric current to the stator 20 to reverse rotational stepping movement of the rotor 50 so as thereby to cause the lend holder 20 to move axially backward. In this way, the helical groove 52a of the lens holder 20 and the helical thread 20a of the cylindrical inner shell 52 of the rotor 50 are prevented from biting each other even in such a step-out state and freed from a step out state.

As shown in FIG. 2, the rear housing shell 40 is provided with a circular race 40a formed in its bottom flange and a positioning limb 40b formed on its bottom flange. The circular race 40a snugly situates the cylindrical inner shell 52 of the rotor 50 in position so as to ensure steady rotation of the rotor 50, and hence the lens holder 20, which prevent the stepping motor from causing possible deterioration in lens driving accuracy and results in ensured performance of the optical lens system. The circular race 40b locates the coil case 32 of the stator 30 in radial position so as thereby to enable the stator 30 to be adjusted in phase while assembling the image pickup unit 1. The rear housing shell 40 functions as a structure for preventing the stator 20 and the rotor 50 from causing positional displacement and, therefore, does a lot to help achieve precise lens driving without incorporating incidental mechanical components which make the unit bulky.

The image pickup unit 1 is further provided with a low-pass filter 41 and a CCD image sensor 60 disposed in the rear housing shell 40. Light from an object is focused on the CCD image sensor 60 with the optical lens system after passing through the low-pass filter 41. The low-pass filter 41 uniformizes frequency components of the light whose spatial frequency is high out of proportion so as thereby to reduce occurrence of defects such as pseudo color and moiré. The CCD image sensor 60 transforms an optical image formed thereon into image data.

Figure 5:
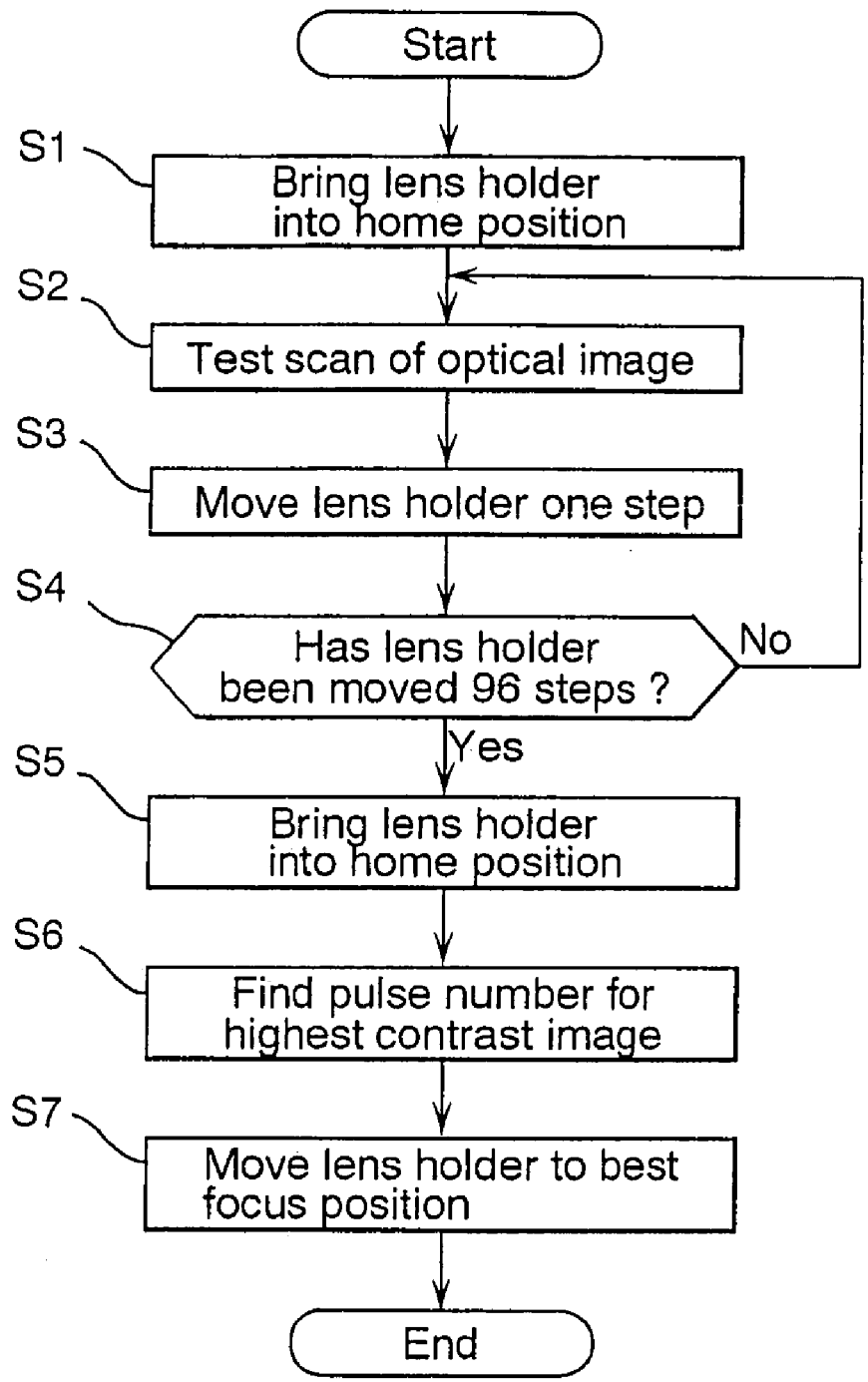
FIG. 5 is a flowchart illustrating a sequential control of automatic focusing operation.

FIG. 5 is a flowchart illustrating a sequence routine of lens position control regarding, for example automatic focusing control, of the image pickup unit 1. In the following description, the term "home position" of the lens holder as used herein shall means and refer to the position in which the helical thread 20*a* of the lens holder 20 strikes against the stopper pillar 55*b* at the extreme end 20*c* as a result from imparting a sufficient number of drive pulses of electric current, for example more than 96 drive pulses of electric current for two revolutions of the rotor 50, to the stator 30.

When sequence logic starts and control proceeds to a block in step S1 where the lens holder 2 is forced to the home position by imparting forward drive pulses of electric current to the stator 30. Subsequently, in step S2, the CCD image sensor 60 performs rough scans of optical images focused thereon and provides image data of low-resolution images. The low-resolution image data is sent to a CPU of a portable information equipment, for example a cell phone in this instance, provided with the image pickup unit 1. After the test scan, the stepping motor is reversed with reversed drive pulse of electric current Specifically, when imparting one reversed drive pulse of electric current to the stator 20, the rotor 50 makes one step of rotational movement, so as thereby to force the lens holder 20 to cause one step of backward axial movement in step S3. In this instance, the lens holder 20 moves an axial distance of 13 µm per one drive pulse of electric current, and hence one step of rotational movement of the rotor 50. This test scan is performed to gain image data of 96 low-resolution optical images by axial stepping movement of the lens holder 20 through its full stroke. When the test scan for 96 low-resolution optical images is completed in step S4, then, the lens holder 20 is immediately forced forward to the home position by imparting forward drive pulses of electric current to the stator 30 of the stepping motor in step S5. Simultaneously, in step S6, the CPU of the cell phone analyzes the image data to find the number of drive pulses of electric current imparted to the stator 30 of the stepping motor until a highest contract optical image is provided. That is, the specific number of drive pulses of electric current indicates the number of steps of rotational movement of the rotor 50, and hence the distance of the lens holder 20 from the home position for the best focus of the optical lens system. Finally, the specific number of reversed drive pulses of electric current are imparted to the rotor 50 of the stepping motor to move the lens holder 20 backward and put the optical lens system into the best focus position.

As just described above, according to the image pickup unit 1 of the present invention, the lens holder 20 is initially brought into an out-step state and put into a restricted home position, and then moved from the home position to a best focus position according to the number of drive pulses of electric current. Therefore, it is not necessary to provide the image pickup unit 1 with a position sensor for finding a best focus position of the optical lens system.

In the image pickup unit 1 embodying the present invention, the stepping motor and the CCD image sensor may be replaced with a DC motor and a MOS type image sensor, respectively. Further, the image pickup unit 1 may be equipped with a zooming feature achieved by the drive unit It is to be understood that although the present invention has been described with regard to a preferred embodiments thereof, various other embodiments and variants may occur to those skilled in the art, which are within the scope and spirit of the invention, and such other embodiments and variants are intended to be covered by the following claims.

What is claimed is:

1. A lens drive unit for performing linear movement of at least one lens element of an optical lens system comprising:

an electric motor comprising a hollow cylindrical stator for generating a magnetic field in a cylindrical space and a hollow cylindrical rotor coaxially disposed within said hollow cylindrical stator and capable of rotating relative to said hollow cylindrical stator within said magnetic field;

a hollow movable cylindrical member for holding said at least one lens element therein which is mounted for relative rotation in said hollow cylindrical rotor; and a motion transformation mechanism for transforming rotational movement of said hollow cylindrical rotor into a linear movement of said hollow movable cylindrical member, said motion transformation mechanism comprising a helical groove formed on an inner wall surface of said hollow cylindrical rotor and a helical thread formed on an outer surface of said movable cylindrical member which engage with each other so that said hollow movable cylindrical member is forced to undergo a linear movement along an optical axis of said optical system when said hollow cylindrical rotor rotates relative to said hollow movable cylindrical member, and a head-on striking structure provided between one end of said helical groove and said helical thread to restrict said relative rotation of said movable cylindrical member.

2. The lens drive unit as defined in claim 1, wherein said electric motor comprises a stepping motor.

3. The lens drive unit as defined in claim 1, wherein said movable cylindrical member comprises a lens holder for holding one or more optical lens elements forming a part of an optical equipment.

4. A lens drive unit for performing linear movement of an optical lens system of an image pickup unit equipped with an image sensor on which an optical image is focused by the optical lens system, said lens drive unit comprising:

an electric motor comprising a hollow cylindrical stator for generating a magnetic field in a cylindrical space and a hollow cylindrical rotor coaxially disposed within said hollow cylindrical stator and capable of rotating relative to said hollow cylindrical stator within said magnetic field;

a movable cylindrical lens holder for holding at least one lens element of the optical lens system therein which is mounted for relative rotation in said hollow cylindrical rotor; and a motion transformation mechanism for transforming rotational movement of said hollow cylindrical rotor into a linear movement of the optical lens system, said motion transformation mechanism comprising a helical groove formed on an inner wall surface of said hollow cylindrical rotor and a helical thread formed on an outer surface of said movable cylindrical lens holder which engage with each other so that said movable cylindrical lens holder is forced to undergo a linear movement along an optical axis of said optical system when said hollow cylindrical rotor rotates relative to said hollow movable cylindrical lens holder, and a head-on striking structure provided between one end of said helical groove and said helical thread to restrict said relative rotation of said movable cylindrical lens holder.

5. The lens drive unit as defined in claim 4, wherein said electric motor comprises a stepping motor.

* * * * *